(12) United States Patent
Christ

(10) Patent No.: US 10,173,467 B2
(45) Date of Patent: Jan. 8, 2019

(54) AXLE UNIT

(71) Applicant: SAF-HOLLAND GmbH, Bessenbach (DE)

(72) Inventor: Armin Christ, Bessenbach (DE)

(73) Assignee: SAF-HOLLAND GmbH, Bessenbach (DE)

( * ) Notice: Subject to any disclaimer, the term of this patent is extended or adjusted under 35 U.S.C. 154(b) by 168 days.

(21) Appl. No.: 15/510,111

(22) PCT Filed: Sep. 8, 2015

(86) PCT No.: PCT/EP2015/070439
§ 371 (c)(1),
(2) Date: Mar. 9, 2017

(87) PCT Pub. No.: WO2016/038003
PCT Pub. Date: Mar. 17, 2016

(65) Prior Publication Data
US 2017/0253083 A1    Sep. 7, 2017

(30) Foreign Application Priority Data
Sep. 12, 2014  (DE) .................. 10 2014 218 328

(51) Int. Cl.
*B60B 35/08*  (2006.01)
*B60B 35/06*  (2006.01)

(52) U.S. Cl.
CPC .............. *B60B 35/08* (2013.01); *B60B 35/06* (2013.01); *B60B 2310/302* (2013.01);
(Continued)

(58) Field of Classification Search
CPC . B60B 35/08; B60B 35/06; B60B 2310/3025; B60B 2900/111;
(Continued)

(56) References Cited

U.S. PATENT DOCUMENTS 2,631,893 A * 3/1953 Cartwright ............ E01C 19/176
239/551
2,631,898 A     3/1953 Long
(Continued)

FOREIGN PATENT DOCUMENTS

CN      1599671     3/2005
CN    101356027     1/2009
(Continued)

OTHER PUBLICATIONS

European Patent Office; International Search Report, dated Nov. 2, 2015.

*Primary Examiner* — S. Joseph Morano
*Assistant Examiner* — Jean W Charleston
(74) *Attorney, Agent, or Firm* — Price Heneveld LLP

(57) ABSTRACT

The present invention relates to an axle unit comprising an axle tube and an axle stub, wherein the axle stub is formed to be rotationally symmetrical with respect to a stub axis in some regions and has a channel which extends substantially parallel to the stub axis, wherein the axle stub has a first connection portion which has an engagement geometry for fluid-tight connection to the channel, wherein the axle tube is formed to be substantially rotationally symmetrical about a tube axis and wherein the axle tube and the axle stub are fixed on/to one another by way of a cross-member in such a way that the tube axis and the stub axis are spaced from one another.

18 Claims, 3 Drawing Sheets

(52) U.S. Cl.
CPC . *B60B 2310/3025* (2013.01); *B60B 2900/111* (2013.01); *B60B 2900/112* (2013.01); *B60B 2900/113* (2013.01); *B60B 2900/115* (2013.01); *B60Y 2200/147* (2013.01)

(58) Field of Classification Search
CPC ......... B60B 2310/302; B60B 2900/112; B60B 2900/115; B60B 2900/113; B60Y 2200/147
USPC .............................. 301/124.1, 125, 127, 129
See application file for complete search history.

(56) References Cited

U.S. PATENT DOCUMENTS

| | | | |
|---|---|---|---|
| 3,792,434 A | | 2/1974 | Williams |
| 5,401,080 A | * | 3/1995 | Wenzel .................... B60B 35/02 |
| | | | 301/131 |
| 5,411,287 A | * | 5/1995 | Henschen ............ B60G 11/183 |
| | | | 267/276 |
| 6,447,073 B1 | * | 9/2002 | Goettker ................ B60B 35/04 |
| | | | 267/276 |
| 2010/0225157 A1 | * | 9/2010 | Kirby ...................... F16D 31/02 |
| | | | 301/131 |
| 2011/0175434 A1 | | 4/2011 | MacKarvich et al. |

FOREIGN PATENT DOCUMENTS

| | | |
|---|---|---|
| FR | 509895 | 11/1920 |
| FR | 2837775 | 10/2003 |
| GB | 152992 | 10/1919 |
| WO | 2012015669 | 2/2012 |

\* cited by examiner

AXLE UNIT

BACKGROUND OF THE INVENTION

The present invention relates to an axle unit, in particular for use in utility vehicles.

Axle units are well known from the prior art. It is moreover known to mount additional motors, for example hydraulic single wheel drives, on axle units in the region of the wheel suspension, for example to enable maneuvering of a trailer in the case of a coupled towing vehicle or, for example, to enable the transmission of an additional drive force to the individual wheels in the case of steep inclines and/or a large load. A great improvement has already been achieved here in the past in that the lines which are needed to supply the additional drive with corresponding hydraulic fluid are integrated in the axle body of a rigid axle. Since the hydraulic lines expediently need to lead to the additional motor by way of the non-rotating part of a wheel suspension and, without the integration of the hydraulic lines in the axle body, this hitherto resulted in an extremely complex, error-prone line arrangement requiring considerable installation space, axle bodies were hitherto used which were capable of accommodating hydraulic lines (axle bodies of solid material). However, these axle bodies have proven very disadvantageous in that they have an extremely high weight. Moreover, the incorporation of longitudinal boreholes in the solid axle body is linked to very high manufacturing costs. There is therefore a need for improvement in terms of reducing the weight of axle bodies with integrated hydraulic lines and in terms of simplifying the manufacture of such an axle body.

The object of the present invention is to provide an axle unit which enables a lower weight and simpler manufacture and at the same time fulfills the high requirements in terms of strength and durability.

SUMMARY OF THE INVENTION

According to the invention, the axle unit comprises an axle tube and an axle stub, wherein the axle stub is formed to be rotationally symmetrical with respect to a stub axis in some regions and has a channel which extends substantially parallel to the stub axis, wherein the axle stub has a first connection portion which has an engagement geometry for fluid-tight connection to the channel, wherein the axle tube is formed to be substantially rotationally symmetrical about a tube axis, wherein the axle tube and the axle stub are fixed to one another, or preferably relative to one another or especially directly or indirectly against one another, by way of a cross-member in such a way that the tube axis and the stub axis are spaced from one another. The axle unit especially comprises an axle tube in the form of a hollow body, which is either fixed on the cross-member at an end which is arranged in the longitudinal direction, or especially merges into the cross-member. The axle unit furthermore comprises an axle stub which is formed to be rotationally symmetrical in some regions and in particular serves for fixing a wheel or a wheel bearing in place. The axle stub is fixed on the cross-member or especially merges into the cross-member. In an alternatively preferred embodiment, the cross-member is formed in one piece with the axle tube. The cross-member is alternatively preferably formed in one piece with the axle stub. The other element—axle tube or axle stub—in each case may be fixed on the cross-member in a corresponding manner. The axle stub has a channel which serves in particular for conducting hydraulic fluid.

The channel is especially formed as a longitudinal bore extending through the axle stub. A first end of the channel here is especially arranged in a first connection portion of the axle stub and a second end of the channel is especially arranged on the opposite side of the axle stub or on the side of the cross-member which is remote from the axle stub. The axle stub is formed to be rotationally symmetrical about a stub axis, at least in some regions, wherein the channel likewise extends especially substantially along the stub axis, preferably parallel to the stub axis. Furthermore preferably, the axle tube is especially formed to be rotationally symmetrical about a tube axis in some regions. The essential function of the cross-member here is to arrange the axle tube and the axle stub relative to one another in such a way that the stub axis and the tube axis are spaced from one another. The tube axis and the stub axis extend particularly preferably parallel to one another here, whereby the axle unit according to the invention can be integrated particularly easily in existing chassis systems. The spacing of the stub axis and the tube axis advantageously ensures that the fluid connections to the channel do not have to be guided out of the axle stub or the axle tube transversely to the stub axis or transversely to the tube axis and a significant local impairment of the strength is thereby prevented. It can be advantageously achieved that the axle stub in which the channel is incorporated is configured to be particularly short and the second connection portion opposite the first connection portion is arranged not in the axle tube but on the end face of the cross-member or the axle stub. This thereby results in a particularly good reachability of the connections for supplying the channel with hydraulic fluid. The axle tube can furthermore preferably be designed as a simple cylindrical tube with a hollow body, whereby the weight can be reduced considerably by comparison with the axle units known from the prior art. It has been shown that, to achieve the required strength, the axle stub should be designed as a solid body, wherein the channel is formed in the axle stub for example by means of a machining process or especially also during the casting of the axle body. To reduce the weight of the axle unit as a whole, it is desirable here to keep the percentage of the regions of the axle unit which are formed as solid bodies as low as possible. In view of the fact that the cutting tools needed to incorporate the channel in the axle unit only need to cover the length of the axle stub and no longer than at least half of the length of an entire axle formed as a solid body, as was previously the case, the manufacture of the axle unit is likewise advantageously simplified in this regard. Within the scope of the present invention, the substantially rotationally-symmetrical form of the axle tube about a tube axis also especially includes deviations of the axle tube from the circular form with the result that, within the scope of the present invention, it is also possible to use an axle tube, for example, which is formed plane-symmetrically with respect to a plane extending through the tube axis or, for example, plane-symmetrically with respect to two planes intersecting one another in the tube axis.

A second connection portion is advantageously provided on the axle stub or the cross-member, wherein the second connection portion has an engagement geometry for fluid-tight connection to the channel. The second connection portion here can especially be formed as a hollow pin which has an external thread which may be fixed in an internal thread corresponding thereto, which is incorporated in the channel. A self-sealing ISO thread is especially suitable here as the thread type for both the internal thread of the channel and the external thread of the hollow pin. The first and the second connection portion furthermore preferably comprise sealing elements which are effective in preventing a leakage of fluid. The connection portion can alternatively preferably also be formed integrally with a hydraulic line, wherein the hydraulic line engages in the corresponding engagement geometry of the channel by means of the connection portion.

The second connection portion is especially accessible from the outside. In other words, the second connection portion is not covered by the cross-member and/or the axle tube. The second connection portion here is advantageously accessible along the stub axis to enable particularly simple assembly of the axle unit.

In a further preferred embodiment, the axle stub has, at its end opposite the first connection portion, a first joining region which is formed for fixing on a correspondingly formed joining region of the cross-member, wherein the first joining region has an extent along and/or transversely to the stub axis. An extent along and transversely to the stub axis is especially defined by an outer surface of the first joining region, which is frustoconical, elliptical in section or especially stepped and which extends both along the stub axis and transversely to the stub axis. Such an engagement geometry of the first joining region is particularly suitable for producing a material-fitting connection between the axle stub and the cross-member by means of a friction welding process. An outer surface of the first joining region which is for example frustoconical in form can, on the one hand, be centered here in a corresponding inner surface of a cutout, which is especially incorporated in the cross-member, or in a recess during the friction welding process and at the same time achieve as uniform a fusing as possible. With a uniform fusing of the corresponding material of the axle stub and the cross-member, it is possible to generate a particularly strong structure of the weld zone, which is capable of absorbing the high forces and bending moments transmitted from the axle stub to the cross-member and ultimately also to the axle tube. An elliptical form of the first joining region is particularly suitable for the initially only regional fusing of the material of the axle stub in the first joining region, whereby, in particular, the forces required during the friction welding process can be kept low and, starting from the initially only point-wise fusing, the zone of fused material spreads uniformly and continuously to the entire region between the first and the second joining region. In the case of a stepped outer geometry of the first joining region, the axial position along the stub axis is especially adjustable with great precision. It goes without saying that combinations of an elliptical cross section of the first joining region and a frustoconical portion, as well as combinations of frustoconical or elliptical portions with a stepped region, for example, can also be provided within the scope of the present invention.

Within the scope of the present invention, substantially transversely to the stub axis means that the first joining region especially has a perpendicular main extent relative to the stub axis. Relatively small deviations from the perpendicular extent relative to the stub axis, which arise during manufacture for example, are permissible here within the scope of the present invention. In this preferred embodiment, at its end face, which is formed to be substantially planar, the axle stub is especially pressed with its end face against the cross-member and fixed on this for example by welding or friction welding. This embodiment is advantageous since it is not necessary to provide a corresponding engagement geometry on the cross-member and a positioning of the axle stub relative to the cross-member is thereby arranged in a flexible manner. In this preferred embodiment, it is possible to produce differently formed axle units with one and the same cross-member and one and the same axle stub, whereby the versatile usability of the axle stub and the cross-member can be increased. The production is furthermore simplified by the substantially perpendicular form of the joining region of the axle stub since it is not necessary to produce an elliptical, frustoconical or other geometry.

In a preferred embodiment, the second connection portion is arranged on the axle stub. It is preferable for not only the first connection portion, but also the second connection portion, to be arranged directly on the axle stub. The manufacture or assembly of the axle unit is simplified here since the first and the second connection portion can already be pre-assembled on the axle stub and merely the connection between the axle stub and the cross-member is produced to assemble the axle unit. In this context, it goes without saying that the cross-member especially has a corresponding cutout through which the second connection portion is accessible through the cross-member. The manufacture of the axle stub can thereby be arranged particularly simply since the axle stub is already equipped with the channel and the connections during its production and is subsequently merely fixed on the cross-member, for example by means of a preferred friction welding process.

The second connection portion is alternatively preferably arranged on the cross-member. In the preferred case in which, to achieve good strength, it is desirable for the connection between the cross-member and the axle stub to be produced over as full a surface as possible in the corresponding first and second joining region, both the channel and the first and the second connection portion are advantageously incorporated in the axle unit only after the axle stub and the cross-member have been joined together. In this case, the channel extends especially beyond the axle stub and through the cross-member, wherein, advantageously, the first connection portion is arranged on the axle stub and the correspondingly opposite second connection portion is arranged on the cross-member. The advantage of this embodiment is that, on the one hand, the possible fastening surface between the axle stub and the cross-member is formed to be as large as possible and, on the other, the channel and the connections can be constructed with a particularly high manufacturing precision as a result of subsequently incorporating the channel, for example by means of a cutting process. In this case, the connections and the channel are especially neither deformed nor damaged as a result of subsequent thermal stresses caused by a welding process. In particular, when dealing with highly pressurized hydraulic fluid, this embodiment is advantageous since it is also possible to achieve a good leak-tightness of both the channel and the first and the second connection portion as a result of the high manufacturing precision.

The channel and/or the second connection portion are furthermore preferably arranged spaced from the first joining region and from the second joining region. In particular, to prevent damage to the channel and/or the second connection portion, this is advantageously arranged spaced from the first joining region and from the second joining region. It is thereby possible to prevent thermal stresses caused by welding the axle stub onto the cross-member in the first and second joining region from adversely affecting or even damaging the walls of the channel and/or the corresponding material regions of the second connection portion. In a particularly preferred embodiment, both the first joining region and the second joining region are substantially annular in form, wherein the region in which the second connection portion is located is arranged in the center of the annulus and especially has a safety clearance from the first and the second joining region.

The axle stub particularly preferably has a fastening portion for fixing a drive unit in place, wherein the fastening portion is especially arranged adjacent to the first connection portion. The fastening portion is notable in particular for an engagement geometry for the force transmission and moment transmission of a drive unit to a wheel which is rotatably mounted on the axle stub or to a wheel hub which is mounted on the axle stub. The drive unit is preferably supported with its non-rotating part on the axle stub. The fastening portion advantageously has a cross-sectional geometry which is not formed to be rotationally symmetrical about the stub axis. The fastening portion is furthermore preferably arranged adjacent to the connection portion, in particular to advantageously connect the drive unit as directly as possibly and without further hydraulic lines to the first connection portion in fluid-tight manner. It is thereby possible to in turn save on weight and reduce the assembly costs.

In a further preferred embodiment, a supporting element is provided, which may be fixed on the cross-member and/or on the axle stub and/or the axle tube to absorb forces and bending moments between the cross-member and the axle stub or the cross-member and the axle tube. The supporting element is, in other words, a rib and is connected outside the first and the second joining region to the axle stub and the cross-member or, alternatively to this, to the axle tube and the cross-member. The supporting element can be used here in particular to absorb forces and bending moments which are transmitted from the axle stub to the axle tube by way of the cross-member. In other words, the supporting element therefore supports the fixing of the axle stub on the cross-member and/or especially also the fixing of the axle tube on the cross-member beyond the respective joining regions between the axle stub and the cross-member and the axle tube and the cross-member. The supporting element here is particularly preferably arranged in such a way that it is possible to absorb bending moments which occur during breaking of the utility vehicle and, accordingly, cause an additional material stress extending transversely to the stub axis as a result of the breaking force. It is preferred here for the supporting element to be formed such that its walls are as thin as possible to keep the increase in weight resulting from the use of a supporting element within as small a range as possible.

In a preferred embodiment, the axle stub is formed as a solid body and the channel is incorporated in the axle stub by means of a machining process. In this context, an axle stub which is not configured as a hollow body is defined in particular as a solid body, wherein the single hollow portion of the axle stub is especially the channel. A face milling process is especially suitable as a machining process for incorporating the channel in the axle stub, wherein it is also alternatively preferably possible to use a die sinking process, for example. Forming the axle stub as a solid body is also advantageous in that it is not necessary to incorporate any additional tube elements in an axle stub formed as a hollow body and the assembly costs are therefore reduced.

The channel is especially connected in a fluid-tight manner to a cross-member channel provided in the cross-member or to a second connection portion provided on the cross-member. In other words, the space available for the hydraulic fluid extends in the channel and in a cross-member channel connected adjacently thereto in a fluid-tight manner, wherein the corresponding second connection portions can advantageously be provided with their engagement geometries in the region of the cross-member channel. Within the scope of the present invention, the cross-member channel here is to be understood as a part or as a widening of the channel in the axle stub, wherein the second connection portion adjoins a cross-member channel in the event that this latter is present.

In an alternatively preferred embodiment, the channel is provided in a sleeve element arranged in the axle stub. In this case, a bore, in which a sleeve element, in other words a tube, may be inserted and fixed on the axle stub, is incorporated in the axle stub, wherein the channel is advantageously arranged in the interior of the sleeve element. This embodiment can be shown to be advantageous if a liquid which could damage the material of the axle stub is to be used as the hydraulic fluid. The sleeve can therefore advantageously be formed from corrosion-resistant stainless steel or a similar coating. The sleeve is furthermore preferably a coating applied in the interior of a bore in the axle stub. Moreover, the sleeve especially extends in a bore of the axle stub and in a bore of the cross-member channel and is equipped at each of its ends with a first connection portion and, at the respectively opposite end, with a second connection portion. In this advantageous embodiment, there is no need to seal the region between the axle stub and the cross-member since the channel is arranged completely in a sleeve formed in one piece.

In a furthermore preferred embodiment, the axle stub is formed together with the channel as a cast body. For particularly simple manufacture of the axle stub, it is preferred for the channel to already be provided in the axle stub during the casting process. In this preferred embodiment, there is no need for subsequent machining of the axle stub. It is thereby possible to reduce the time required to produce the axle stub and therefore the time required to produce the axle unit.

In a further preferred embodiment, the axle stub has a plurality of channels, wherein a plurality of first connection portions and second connection portions are in fluid-conducting communication with a respective channel or with multiple channels. To supply a drive unit, at least two channels are advantageously provided, of which one is configured for the fluid to flow in the direction of the drive unit and the other, in each case, is configured for the hydraulic fluid to flow back in the direction of the pump device. It has proven advantageous here for the channel through which the fluid flows at the higher pressure to have greater wall thicknesses in each case than the other channels of the axle stub as seen in a cross section transversely to the stub axis. To simplify the connection of hydraulic fluid lines to the axle unit, it is preferred for a first and/or a second connection portion to be provided, which are in fluid-conducting communication with two or more respective channels. It is thereby possible for a plurality of consumers to be supplied with hydraulic fluid by means of one supply line, for example. An embodiment having four channels is particularly preferred, of which two channels function as pressure lines, one channel functions as a return line and one channel functions as a thermal line for introducing heated hydraulic fluid into the drive unit.

The tube axis and the stub axis are advantageously substantially parallel to one another. As a result of the mutually parallel alignment of the tube axis and the stub axis, it is in particular possible to integrate the present axle unit in existing chassis systems of utility vehicles, since the axle tube of the present invention can advantageously be used in the installed positions in the manner of an axle body formed as a solid body.

The axle tube is particularly preferably welded on the cross-member, especially by means of a friction welding process. To enable the forces and bending moments occurring during operation of the axle unit to be transmitted from the axle tube to the cross-member, a welded connection is preferred. A customary thermal welding process, for example arc welding or gas-shielded welding, is suitable here in particular for welding non-rotationally symmetrical geometries of either the cross-member and/or the axle tube. It would furthermore be especially possible to provide a corresponding projection on the axle tube or the cross-member with a corresponding recess on the other component in each case, wherein the axle tube and the cross-member are initially joined to one another with form fit and then fixed to one another with material fit with the support of a welded connection. The friction welding process is suitable in particular for producing the connection between the axle tube and the cross-member since the axle tube, which is formed to be substantially rotationally symmetrical, can be pressed in a rotating manner against the cross-member and it is thereby possible to achieve a uniform fusing and, by comparison with thermal welding, only relatively low thermal stresses.

In a particularly preferred embodiment, the tube axis and the stub axis are spaced from one another by an offset, wherein the ratio of the offset to a stub length of the axle stub is 0.2 to 2, especially 0.3 to 1.5 and, particularly preferably, ca. 0.8 to 1. The stub length of the axle stub here is especially the maximum extent of the axle stub along the stub axis. The tube axis and the stub axis extend especially parallel to one another and are spaced from one another with an offset. It has proven advantageous to keep the ratio of the offset to the stub length in a range of 0.2 to 2 since, in this way, a particularly good reachability of the second connection portion is ensured on the one hand and, on the other, the connection comprising the axle tube, cross-member and axle stub is suitable for transmitting particularly high forces and bending moments, since the preferred limits of the corresponding lever arm are kept. The ratio range of 0.3 to 1.5 achieved particularly good values here, in particular for use in utility vehicle trailers, since, on the one hand, there is a correspondingly high flexibility in terms of the attachment of the axle stub to the cross-member and, on the other, as a result of the relatively large offset compared to the stub length, it is possible to arrange a relatively compact axle stub on the cross-member in such a way that a particularly good reachability of the second connection portions is produced at the same time. The particularly preferred range of 0.8 to 1 has shown to be optimum for use in particularly highly-loaded utility vehicles since, on the one hand, the particularly high strength of the connection between the axle stub, cross-member and axle tube is ensured and, on the other, the cross-member can be configured to be only relatively short or compact and is therefore capable of transmitting higher forces and bending moments than would be the case for a particularly long cross-member and a particularly large offset of the stub axis from the tube axis.

Further advantages and features of the present invention are revealed in the description below with reference to the accompanying figures. It goes without saying that individual features described in the embodiments can also be used in other embodiments where this is not ruled out explicitly or arises due to technical reasons.

BRIEF DESCRIPTION OF THE DRAWINGS

The figures show.

DETAILED DESCRIPTION OF THE PREFERRED EMBODIMENTS

Figure 1:
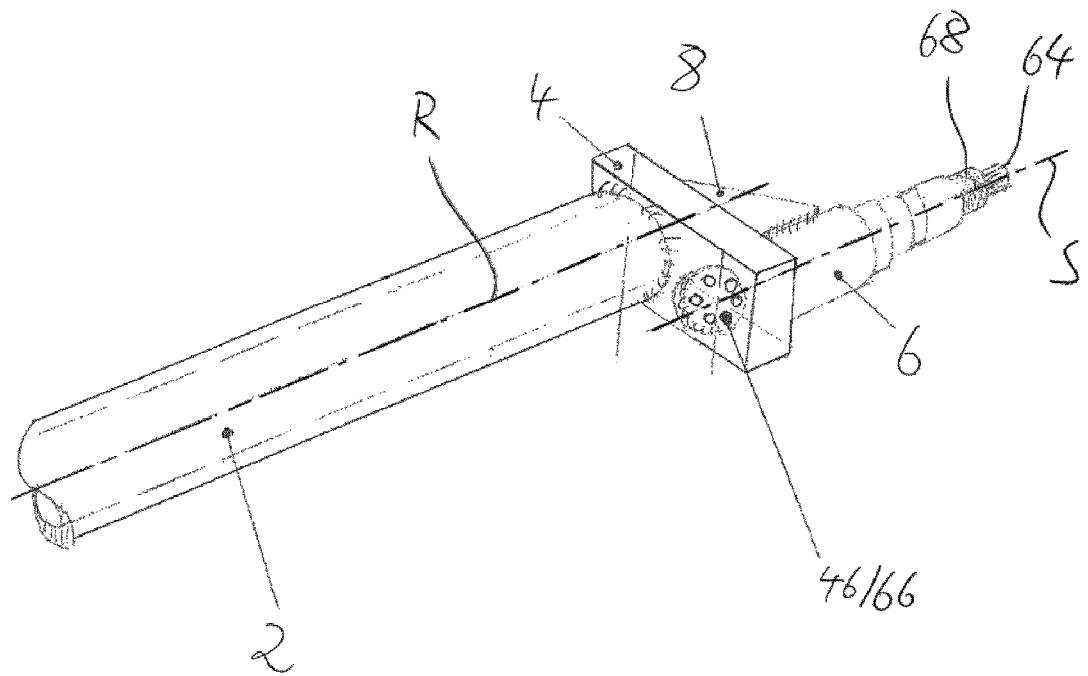
FIG. 1 a perspective view of a preferred embodiment of the axle unit according to the invention.

FIG. 1 shows a schematically simplified and perspective view of a preferred embodiment of the axle unit according to the invention. In this, an axle tube 2 is connected to an axle stub 6 by way of a cross-member 4. The axle tube 2 extends substantially along a tube axis R and is advantageously formed to be rotationally symmetrical with respect to the axis of rotation R. The cross-member 4 is advantageously designed in the manner of a plate, wherein the axle tube 2 is or may be fixed on a first side of the cross-member 4. A welded seam between the axle tube 2 and the cross-member 4 is indicated in the figure. The axle stub 6 extends substantially along a stub axis S and is formed to be rotationally symmetrical about the stub axis S at least in some regions. The axle stub 6 here is or may be fixed on the cross-member 4 on the side of the cross-member which is remote from the axle tube 2. The axle unit furthermore preferably has a second connection portion 46, 66 which is arranged either on the cross-member 4 or on the axle stub 6. In the embodiment shown in the present figure, the second connection portion 46 is arranged on the cross-member 4. To support the connection between the axle stub 6 and the cross-member 4, a supporting element 8 is furthermore provided which is advantageously fixedly welded both to the axle stub 6 and to the cross-member 4. The axle stub 6 advantageously has a fastening portion 68 which is configured for fixing a drive unit (not illustrated) on the axle stub 6 in a non-rotatable manner. A first connection portion 64 is especially provided on the axle stub 6, adjacent to the fastening portion. The connection portion 64 is connected in a fluid-tight manner to at least one channel 62 (not illustrated).

Figure 2:
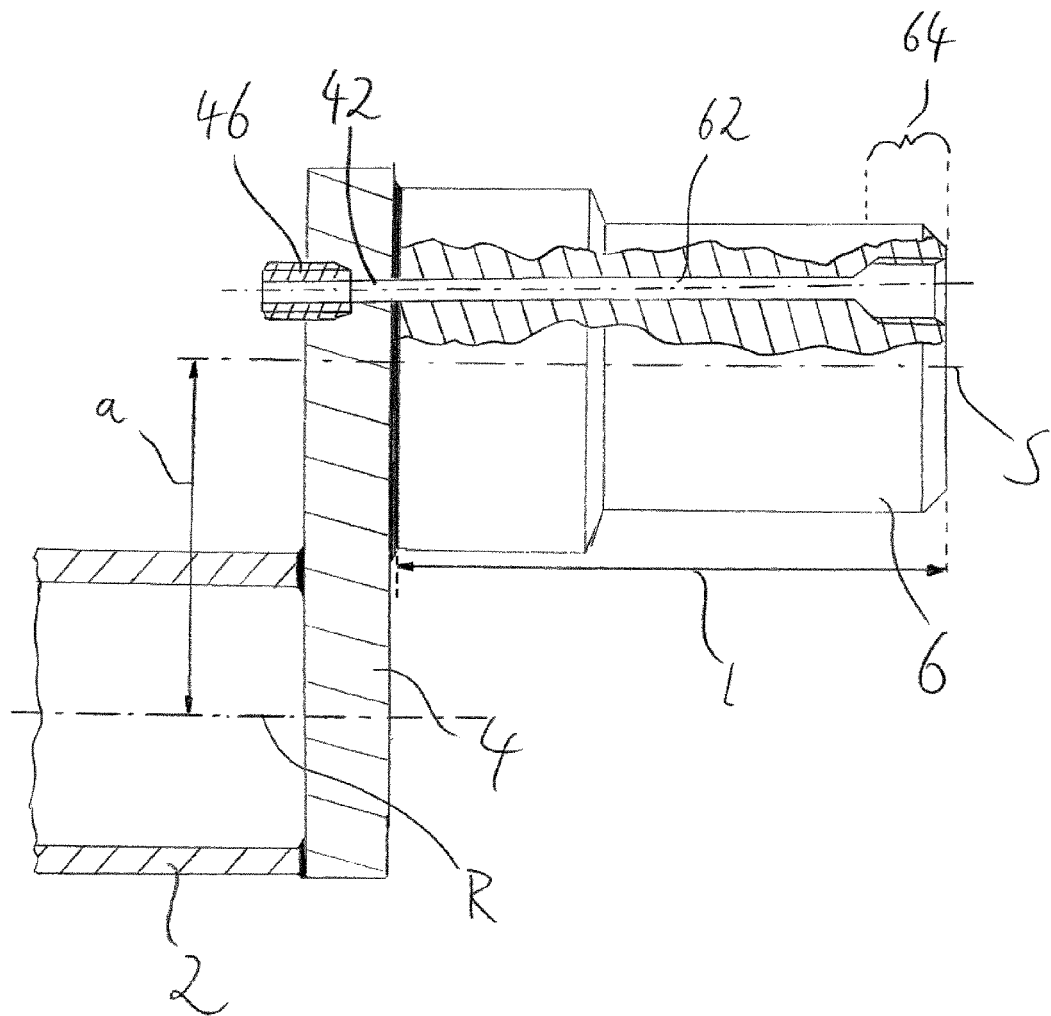
FIG. 2 a partially sectional view of a preferred embodiment of an axle unit according to the invention.

FIG. 2 shows a partially sectional view of a preferred embodiment of the axle unit according to the invention. Essential features of the embodiment illustrated in FIG. 2 correspond here to the embodiment illustrated in FIG. 1. The axle stub 6 is illustrated in section in some regions, wherein the course of the channel 62 arranged in the axle stub 6 and the connection portions 64, 46 provided at the respective ends of the channel are clearly shown. The part of the channel 62 which extends in the axle stub 6 as well as the cross-member channel 42 which extends in the cross-member are shown here. The first connection portion 64 is advantageously designed as a threaded bore in which a corresponding connection element of a drive unit can be incorporated, fixed and connected in a fluid-tight manner to the channel 62. Alternatively, the first connection portion 64 and/or the second connection portion 46/66 can be formed as an outwardly protruding projection, wherein this, equipped with an external thread or a bayonet connection, may be connected directly to a hydraulic hose. The preferred offset a between the stub axis S and the tube axis R is furthermore shown, with the ratio of this offset to a stub length l especially being 0.2 to 2. The stub length l is shown as the maximum extent of the axle stub 6 along the stub axis S. The second connection portion 46 is advantageously designed as a hollow pin, which is equipped with an external thread and, on the one hand, may be brought into engagement with the cross-member 4 or a bore incorporated in the cross-member 4 and, on the other hand, is suitable for fixing a fluid line in place for connection to a corresponding hydraulic fluid reservoir. As a result of the arrangement of the first connection portion 64 of the channel 62 of the cross-member channel 42 and the second connection portion 46 along a parallel to the stub axis S, the strength of the axle stub 6 can be increased in particular, since no bores extending transversely to the stub axis S are incorporated in the axle stub 6 or in the cross-member 4. The bores extending along the stub axis S weaken the strength of the axle stub 6 here to a lesser extent than bores which are incorporated transversely to the stub axis S.

Figure 3:
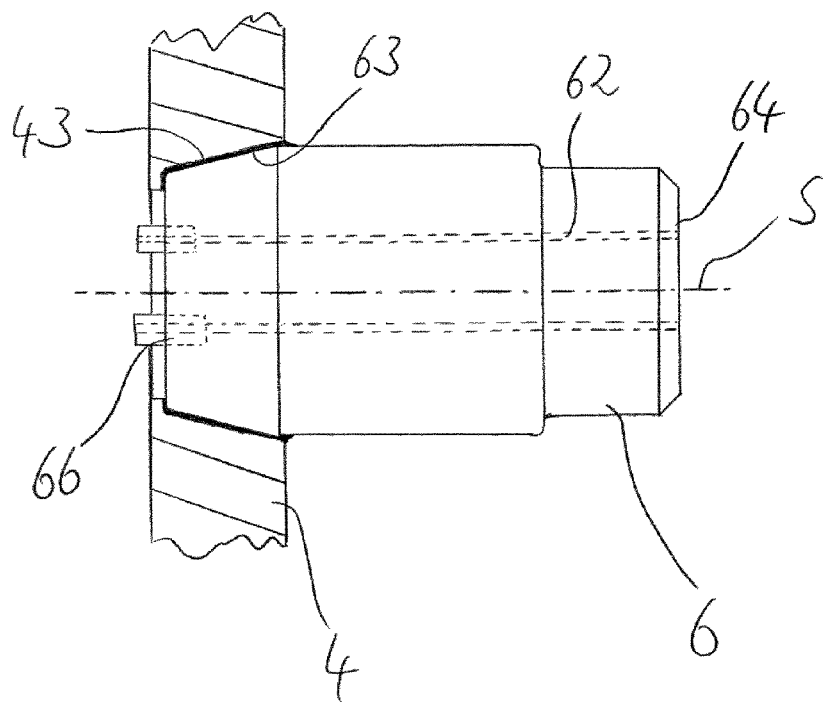
FIG. 3 a further partially sectional view of a preferred embodiment of the axle unit according to the invention.

FIG. 3 shows a further preferred embodiment of the axle unit according to the invention, wherein the axle stub 6 has two channels 62 and wherein the second connection portions 66 are also provided on the axle stub 6 in addition to the first connection portions 64. In contrast to the embodiments shown in FIGS. 1 and 2, the axle stub 6 has a joining region 63 which extends both along the stub axis S and transversely to the stub axis S. In other words, the joining region 63 of the axle stub 6 is especially conical in form, which means that, in other words, the outer surface of the joining region 63 of the axle stub 6 has a frustoconical geometry. The joining region 63 furthermore preferably also has a region which extends transversely to the stub axis S but which, in the figure illustrated here, is very small by comparison with the rest of the joining region 63. The cross-member 4 has a second joining region 43, which especially corresponds substantially to the first joining region 63 of the axle stub 6. It goes without saying that, in the embodiment illustrated in FIG. 3, the axle stub 6 can be particularly favorably pressed in a rotating manner against the cross-member 4, from right to left in the figure, and a friction welded connection can thereby be generated between the cross-member 4 and the axle stub 6 in the first joining region 63 and in the second joining region 43 in each case. The preferred feature of the present invention is furthermore illustrated, in which the second connection portion 66 and the channel 62 are arranged spaced from the first joining region 63 and the second joining region 43. It is thereby possible for the adverse effect on the channel 62 and the second connection portion 66 resulting from thermal stresses which occur during the welding process to be kept particularly low.

Figure 4:
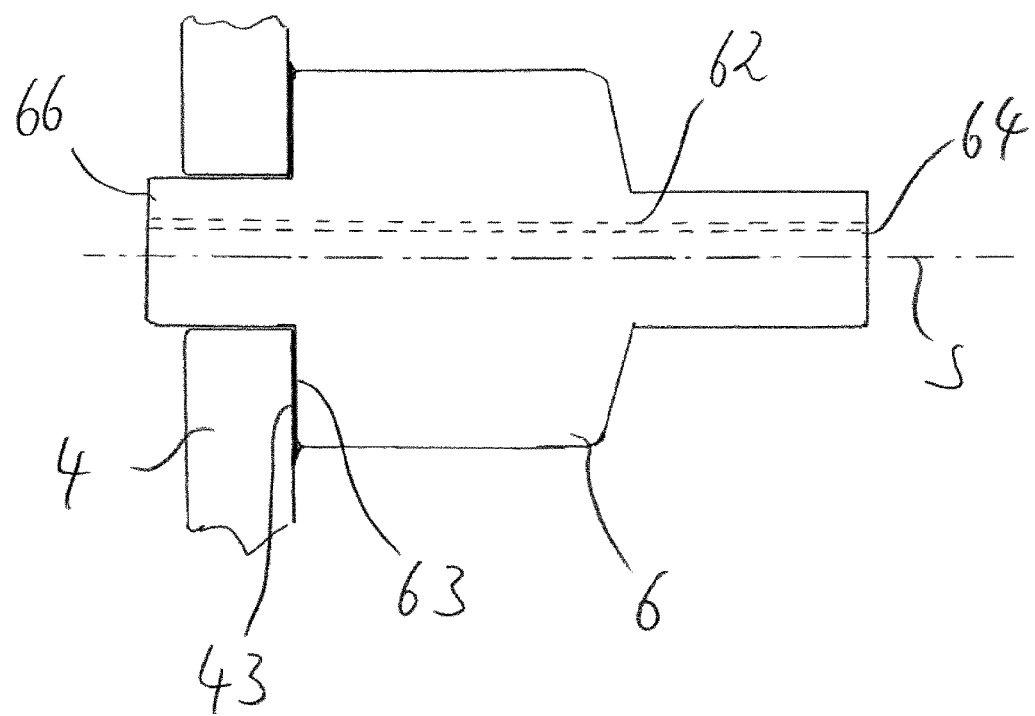
FIG. 4 a further partially sectional view of a preferred embodiment of the axle unit according to the invention.

FIG. 4 shows a further preferred embodiment of the axle unit according to the invention, wherein the axle stub 6 especially has a stepped geometry on its side facing the cross-member 4. The first joining region 63 of the axle stub 6 and the second joining region 43 of the cross-member 4 extend substantially transversely to the stub axis S here. It is in turn illustrated that both the channel 62 and the first connection portion 64 and the second connection portion 66 are arranged completely on the axle stub 6 and are at the same time spaced from the joining region 63 and 43. In this embodiment, the axle stub together with the channel 62 and the connection portions 64 and 66 can advantageously already be produced in full before being put together with the cross-member 4, whereby not only is the material volume to be assembled relatively low, with the manufacture being simplified as a result of this alone, but also multiple channels 62, for example, can be incorporated in the axle stub 6 at the same time by die sinking. The first connection portion 64 and the second connection portion 66 here are indicated only relatively schematically in the figure and can be formed for example in the manner outlined in FIG. 2. The advantage of the embodiment shown in FIG. 4 is that the axle stub 6 and the cross-member 4 can be positioned particularly precisely with respect to one another, in particular along the stub axis S. The moment of inertia of the connection region between the axle stub 6 and the cross-member 4 in a transverse plane with respect to the stub axis S is particularly high owing to the large diameter, with the result that the connection between the axle stub 6 and cross-member 4 is particularly suitable for transmitting high bending moments and torsion moments between the axle stub 6 and the cross-member 4.

LIST OF REFERENCE SIGNS

2—Axle tube
4—Cross-member
42—Cross-member channel
43—Second joining region
46—Second connection portion (on the cross-member)
6—Axle stub
62—Channel
63—First joining region
64—First connection portion
66—Second connection portion (on the axle stub)
68—Fastening portion
8—Supporting element
R—Tube axis
S—Stub axis
a—Offset
l—Stub length

The invention claimed is:

1. An axle unit, comprising:
   an axle tube; and
   an axle stub;
   wherein the axle stub is rotationally symmetrical with respect to a stub axis in some regions and has a channel which extends substantially parallel to the stub axis;
   wherein the axle stub has a first connection portion which has an engagement geometry for fluid-tight connection to the channel;
   wherein the axle tube is substantially rotationally symmetrical about a tube axis;
   wherein the axle tube and the axle stub are fixed to one another by way of a cross-member such that the tube axis and the stub axis are spaced from one another; and
   wherein a second connection portion opposite the first connection portion is arranged on at least one of the end face of the cross-member and the axle stub.

2. The axle unit as claimed in claim 1, wherein the second connection portion has an engagement geometry configured for fluid-tight connection to the channel.

3. The axle unit as claimed in claim 2, wherein the second connection portion is accessible from the outside.

4. The axle unit as claimed in claim 3, wherein at least one of the channel and the second connection portion are arranged spaced from the first joining region and from the second joining region.

5. The axle unit as claimed in claim 2, wherein the second connection portion is arranged on the cross-member.

6. The axle unit as claimed in claim 2, wherein the second connection portion is arranged on the axle stub.

7. The axle unit as claimed in claim 2, wherein the channel is connected in a fluid-tight manner to at least one of a cross-member channel provided in the cross-member, and to a second connection portion on the cross-member.

8. The axle unit as claimed in claim 1, wherein the axle stub has, at an end of the axle stub opposite the first connection portion, a first joining region which is configured to fix on a corresponding second joining region of the cross-member, and wherein the first joining region has an extent at least one of along and transversely to the stub axis.

9. The axle unit as claimed in claim 1, wherein the axle stub has a fastening portion configured to fix a drive unit in place, and wherein the fastening portion is especially arranged adjacent to the first connection portion.

10. The axle unit as claimed in claim 1, wherein a supporting element is configured to be fixed on the cross-member and on at least one of the axle stub and the axle tube to absorb forces and bending moments between the cross-member and the at least one of the axle stub and the axle tube.

11. The axle unit as claimed in claim 1, wherein the channel is located in a sleeve element arranged in the axle stub.

12. The axle unit as claimed in claim 1, wherein the axle stub is integral with the channel as a cast body.

13. The axle unit as claimed in claim 1, wherein the axle stub has a plurality of channels, wherein a plurality of first connection portions and second connection portions are in fluid-conducting communication with the channel.

14. The axle unit as claimed in claim 13, wherein the channel is one of multiple channels.

15. The axle unit as claimed in claim 1, wherein the axle tube is friction welded to the cross-member.

16. The axle unit as claimed in claim 1, wherein the tube axis and the stub axis are spaced from one another by an offset, and wherein the ratio of the offset to a stub length of the axle stub is 0.2 to 2.

17. The axle unit as claimed in claim 16, wherein the ratio of the offset to the stub length is from 0.3 to 1.5.

18. The axle unit as claimed in claim 17, wherein the ratio of the offset to the stub length is from 0.8 to 1.

* * * * *